Oct. 26, 1937.    T. FOX    2,097,320
LOCKING DEVICE FOR COTTERS
Filed Sept. 24, 1936
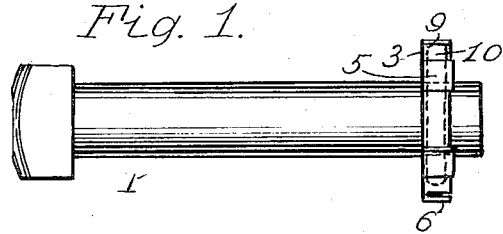
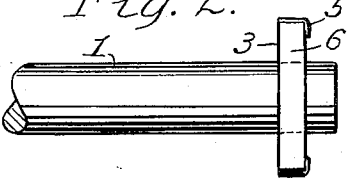
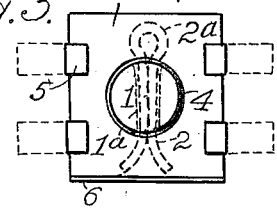
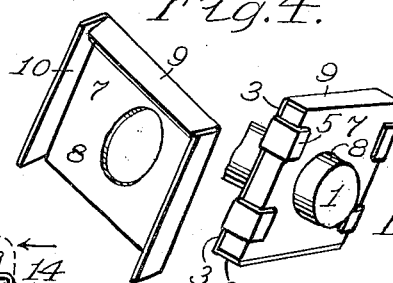
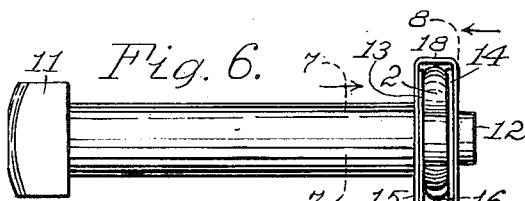
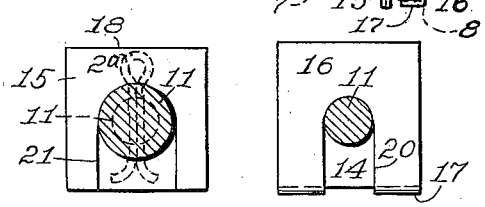
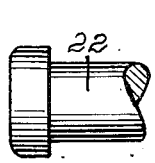
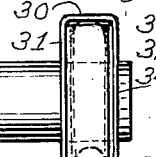
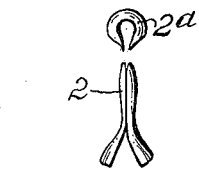
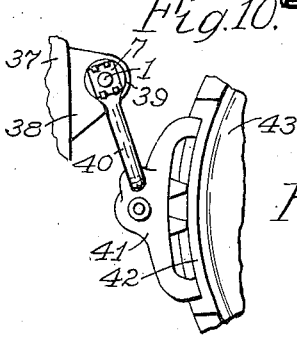
Inventor
Telford Fox,
By G. C. Kennedy,
Attorney Patented Oct. 26, 1937

2,097,320

UNITED STATES PATENT OFFICE 2,097,320

LOCKING DEVICE FOR COTTERS

Telford Fox, Waterloo, Iowa, assignor of one-half to Norman Bell, Waterloo, Iowa Application September 24, 1936, Serial No. 102,346

10 Claims. (Cl. 85—5)

My invention relates to improvements in locking devices for bolt cotters, and the object of my improvements is to supply a device of this nature adapted to lock such a cotter in its seat against lengthwise shifting therein to thus prevent rapid wearing and loss of the cotter, particularly when this combination is used with a brake hanger as in railroad cars.

Another improvement consists in using simple and inexpensive elements in such a device, readily assemblable or disassemblable, and connected separably in a manner to effect the above functions.

I have accomplished the above objects by the means which are hereinafter described, claimed, and exhibited in the appended drawing.

It is to be understood that the specific devices shown herein are illustrative only of such means as may be used with which to accomplish the above objects as will display therein a few only, and without relinquishing my right to claim the exclusive use of other similar devices which effect these objects.

Figure 1 is a side elevation of a brake hanger bolt with incased cotter according to a simple form of my invention, and Fig. 2 is a like elevation thereof, with head of the bolt removed, and the cotter incasement presented at an angle of ninety degrees from the showing of said Fig. 1. Fig. 3 is an end elevation of said incasement showing the side clips clamped in place, the dotted lines showing these clips as extended laterally, the incasement mounted upon the bolt and the cotter being shown in dotted lines as incased against lengthwise shifting in its seat in and across the bolt. Fig. 4 is a perspective view of one of the clamping elements, and Fig. 5 is a perspective view of the incasement of Fig. 3 as mounted on the bolt. Fig. 6 is a side elevation of a varied construction of the incasement as mounted for a like purpose on a bolt. Fig. 7 is a cross section of Fig. 6 in the broken line 7—7 of the latter, and Fig. 8 is a cross section of Fig. 6 on the broken line 8—8 thereof. Fig. 9 is an end elevation of one of the two clamping plates 13 and 14 of Fig. 6. Fig. 10 is a side elevation of another varied incasement, and Figs. 11 to 13 are perspectives of the elements thereof. Fig. 14 is an elevation of a worn and severed cotter. Fig. 15 is a detail of my invention as part of a brake hanger means.

My invention is particularly designed for railway practice, although it may be employed for any other installations to overcome like difficulties in use in saving bolt cotters from excessive or in fact any considerable wear and breakage under the stresses of service, where longitudinal to and fro shifting of the cotter lengthwise may result in rupture thereof and the loss of the cotter from the bolt.

The device of Figs. 1 to 5 inclusive shows a simple two element incasement for a split cotter or other type of cotter seated in a transverse bore in a bolt opposite its head, as shown in Fig. 1 in dotted line. The dotted line cotter representation 2 with curvate medial head portion 2a is shown in Fig. 3 traversing the cross bore or hole 1a of the bolt 1, the ends of the split cotter being spread apart below the bolt. Fig. 15 displays the ordinary installation of a braking device for a railway car, wherein the fragmentary part 37 of a brake-beam has a pair of transversely apertured lugs 38 traversed by a bolt such as shown at 1 in Fig. 1 having a pin-hole 1a to seat a split cotter pin of the type 2—2a of said figure. This cotter is incased in a sectional case composed of plates 3 and 7 spaced apart. A loop-shaped hanger 40 has end eyes 39 seated on the bolt 1 inside said case. The cross part of the hanger 40 is pivotally seated in a brake-block 41 carrying the brake-shoe 42 which may be brought into or out of contact with the tread of a car-wheel 43 by well-known means.

The incasement of the cotter 2 shown in Figs. 1 to 5, is composed of a coacting pair of spaced elements 3 and 7 separably fitted together to inclose the cotter 2—2a and having respectively flanges 6 and 9 for contacting with the cotter ends and eye 2a, thus preventing lengthwise shifting of the cotter in its seat 1a, and also preventing wear of the cotter, which soon in railway use, causes the cotter to wear away and break apart as shown in Fig. 14, the fragments leaving the seat 1a, and the brake device permitted to fall between rails and car-wheels, usually ditching the car or train.

The incasement part 3 has a bottom flange 8 but has no top flange, and has at each side edge a spaced pair of like bendable projections 5. The part 3 is emplaced upon the bolt slidably before the cotter 2—2a is seated in the hole 1a, and then brought into contact with the cotter. The other plate 7 has a top flange 9 contacting with the top edge of the plate 3, and is likewise mounted on the end part of the bolt in contact with the cotter. The bottom flange 6 of the plate 3 then covers the lower unflanged edge of the plate 7. The plate 7 has side flange 10 abutting the inner side edges of the plate 3. The projections 5 of the plate 3 may be bent twice to cross the side flanges 10 of the plate 7 and to then extend inwardly in contact with the abutting outer face of the plate 7, thus clamping the plates 3 and 7 to each other and upon the cotter while the said top flange 9 engages the eye part 2a of the cotter, and the lower flange 6 engages the lower separated ends of the cotter. It is evident that the cotter is thus prevented from lengthwise shifting to and fro in the bolt-hole 1a under the rapidly repeated stresses and shocks of use, and wear of a destructive nature prevented in the cotter, such as would ruin it dangerously, as indicated in the fragmentary cotter of Fig. 14. It has been observed that unprotected cotters are worn out and escape from their seats when a heavily loaded train has traveled 140 miles, and my incasement as above obviates this. It is to be noticed that both plates 3 and 7 are provided with like circular central openings 8 to seat them upon the bolt 1.

The cotter incasements shown in Figs. 6 and 10, preserve therein the same uses and vary in details of their assemblages only specifically from the device hitherto shown and described. In the device of Fig. 6, while the free end of the bolt designated 11 has a diminished terminal 12 providing an annular shoulder thereunder, the incasement of the cotter 2 there shown may be mounted likewise upon a bolt of even diameter without departure from my invention.

The outer casing member consists of a plate bent in parallel crosswise about medially with top wall 18 and spaced transverse walls or plate parts 15 and 16, the lower end of the part 16 having a narrow inturned ledge 17. Between the parts 15 and 16 quadrangular plates with like central circular apertures 19 (as at 13 and 14 in Figs. 9 and 8) are seated on the bolt terminal 12 and contacting opposite faces of the cotter 2, removably. The top portion 18 of the outer casing member contacts with the cotter eye, while the bottom ledge 17 of its wall part 16 engages the lower split apart and spread ends of the cotter 2. The latter is thus locked against endwise oscillations or shifting in its seat in the terminal 12.

The device shown in Figs. 10 to 13 inclusive slightly varies from the device of Figs. 6 to 9 inclusive as an assemblage. The bolt 22 like the bolt 1 is not terminally diminished, and has a like seating hole therethrough with a like cotter seated therein. The outer casing member is similar to the outer casing member of Fig. 6, having a top wall 30 and opposite evenly spaced depending walls 31 and 33, both having like reentrant bottom opening apertures 32 and 35 to seat them across the bolt at opposite outer faces of the walls 31 and 33. In Fig. 9 is shown an angle-plate 23 having one side flange 24, and this angle-plate is, like another but reversed angle-plate 26 seated between and in contact with the inner faces of the walls 31 and 33. Both inner plates are centrally apertured at 25 and 27 respectively to seat them upon the bolt at opposite faces of the traversing cotter 2—2a and in contact therewith. The flange 24 of the angle-plate 23 then closes one side opening of the incasement. The angle-plate 26 has a side flange 29 which closes the opposite side opening of the incasement, and the plate 26 has also a bottom flange 28 to close the bottom opening of the incasement. The cotter is thus inclosed all around by its interlocking with said devices, the inturned parts 36 of the wall 33 engaging the flange 28 of the wall part 26.

I claim:

1. The combination with an element having a cotter-seat, of a cotter traversing said seat, and mutually separably coengaged clamping means removably mounted on said element for positively end-engaging and clamping, and preventing endwise movements of the cotter in said seat.

2. The combination with an element having a cotter-seat, of a cotter traversing said seat, and separably coengaged clamping means removably mounted on said element and positioned to limit endwise movements of the cotter in said seat, due to rapid and violent oscillations of said element.

3. The combination with an element having a cotter-seat, of a headed cotter loosely traversing said seat, and sectional separably engaged devices removably mounted on said element and positioned thereon to prevent shocking vibrational shifting endwise movements of the cotter.

4. The combination with a headed bolt or the like having a transversely apertured seat opposite the bolt-head, of a pair of separably mated clamping incasements seated removably on the bolt, and a headed split-key loose in said seat engaged terminally by the incasements to prevent longitudinal friction of the split-key within said seat, and to prevent severance of the split-key between its ends.

5. The combination with a bolt or the like having a transverse cotter-seat, of a cotter or the like removably mounted in said seat to project endwise therefrom, and apertured members removably mounted on the bolt at opposite sides of the cotter and respectively having flanges directed to inclose the cotter ends and limit and prevent movements of the cotter in said seat which might cause destructive frictional wear of the cotter therein.

6. Means for preventing destructive frictional wear of a cotter or the like in a seat of a carrier element subjected to vibrational stresses, consisting of mated apertured wall parts mounted removably on the element, a cotter or the like removably movably mounted in said seat between and embraced by said wall parts, said wall parts respectively having flanges for engaging opposite ends of the cotter, and one wall part having opposite bendable projections to be bent about the other wall part to separably lock said parts together.

7. Means for preventing destructive frictional wear of a cotter or the like loosely traversing the seat of a carrier element to project therebeyond at both ends, consisting of the combination of a carrier element having a transverse cotter-seat, a cotter or the like traversing said seat, mated apertured wall parts mounted removably on said element at opposite sides of said seat and said cotter, said parts having inwardly directed flanges respectively cooperating to inclose their interspace therearound with an opposed pair of the flanges engaging the ends of the cotter, and one wall part having bendable opposite pairs of projections adapted to be bent around and clampingly engage the other wall part removably.

8. In a device of the character described, in combination, a bolt or the like having a transverse end cotter-seat, a cotter or the like in said seat and projecting at opposite ends therefrom, apertured plates mounted on said bolt at opposite sides of and engaging said cotter, and a clamping member medially bent to cross one end of the cotter engagingly and to have spaced opposite wall parts inclosing and engaging said plates, the said wall parts having end terminations of which one is bent to engage the abutting end part of the adjacent plate and both wall parts having reentrant seats to mount them removably upon said bolt.

9. In a device of the character described, in combination, a bolt or the like having a diminished terminal provided with a transverse cotter-seat adjacent a shoulder, a cotter or the like in said seat and projecting at opposite ends therefrom, apertured plates mounted on said terminal abutting said shoulder and engaging opposite sides of the cotter, and a clamping member medially bent to cross one end of the cotter engagingly and to have spaced opposite wall parts inclosing and engaging said plates and also engaging said shoulder, the said wall parts having end terminations of which one is flanged inwardly to engage and support the adjacent end of one plate, and both wall parts having reentrant seat openings to seat them removably on said terminal.

10. In a device of the character described, in combination, a bolt or the like having a transverse cotter-seat, a cotter or the like loosely traversing said seat to project terminally therefrom, apertured plates mounted on said bolt at opposite sides of and inclosing said cotter, the plates respectively having flanges to coact in inclosing the interspace thereof, and certain of the flanges engaging opposite ends of the cotter to prevent lengthwise frictional movements of the cotter against its seat, and a clamping member bent to cross one end of the cotter and with opposed wall parts engaging said plates, the member having opposite reentrant openings to seat said bolt therein and also having one inwardly bent flange to engage the abutting wall flange of the adjacent plate.

TELFORD FOX.